(12) United States Patent
Stephens et al.

(10) Patent No.: US 10,554,929 B2
(45) Date of Patent: *Feb. 4, 2020

(54) VIDEO COMMUNICATION SYSTEM AND METHOD FOR USING SAME

(71) Applicant: NSIXTY, LLC, Cincinnati, OH (US)

(72) Inventors: James Matthew Stephens, Cincinnati, OH (US); Matthew Berlage, Cincinnati, OH (US)

(73) Assignee: NSIXTY, LLC, Cincinnati, OH (US)

(*) Notice: Subject to any disclaimer, the term of this patent is extended or adjusted under 35 U.S.C. 154(b) by 479 days.

This patent is subject to a terminal disclaimer.

(21) Appl. No.: 15/054,307

(22) Filed: Feb. 26, 2016

(65) Prior Publication Data

US 2016/0205354 A1 Jul. 14, 2016

Related U.S. Application Data

(63) Continuation of application No. 14/084,258, filed on Nov. 19, 2013, now Pat. No. 9,313,456, which is a
(Continued)

(51) Int. Cl.
*H04N 7/15* (2006.01)
*H04N 5/225* (2006.01)
(Continued)

(52) U.S. Cl.
CPC .............. *H04N 7/152* (2013.01); *G06Q 10/10* (2013.01); *G06Q 20/204* (2013.01); *G11B 27/02* (2013.01);
(Continued)

(58) Field of Classification Search
CPC ......... B64F 1/366; H04L 51/10; H04N 7/152; H04N 5/2252; H04N 5/2253;
(Continued)

(56) References Cited

U.S. PATENT DOCUMENTS 5,018,186 A * 5/1991 Kimura ................... H04N 7/12
348/14.14
6,085,195 A † 7/2000 Hoyt
(Continued)

FOREIGN PATENT DOCUMENTS

WO 2010083391 7/2010
WO 2012033506 3/2012

OTHER PUBLICATIONS

Elgart et al., Digital Photo Lifecycle: Triaging for Sharing Stories. Masters Thesis, Carnegie Mellon University (online), published Dec. 31, 2007. Retrieved on Mar. 30, 2010. Retrieved from www.hcii.cmu.edu/m-hcl/2007/microsoft/images/spring.pdf.
(Continued)

*Primary Examiner* — Gerald Gauthier
(74) *Attorney, Agent, or Firm* — McDonald Hopkins LLC

(57) ABSTRACT

The present invention provides a video communication system including a kiosk for recording video messages created by a user and a database for storing and providing access to the video messages. The kiosk includes a user interface for receiving user information such as name, address, email, and other identifying information. The kiosk further includes a message-recording device for recording a user video message. The video message and user message data are uploaded to a database. The database reconnects with the user through the user information to allow the user to access the video message. In an embodiment, the database sends an email web link to the user. The user may view the video message by opening the email web link and viewing the video message on an internet website.

19 Claims, 4 Drawing Sheets

Related U.S. Application Data continuation of application No. 12/688,238, filed on Jan. 15, 2010, now Pat. No. 8,619,115.

(60) Provisional application No. 61/205,140, filed on Jan. 15, 2009.

(51) Int. Cl.

| | | |
|---|---|---|
| G11B 27/02 | (2006.01) | |
| H04N 7/16 | (2011.01) | |
| G06Q 10/10 | (2012.01) | |
| G06Q 20/20 | (2012.01) | |
| H04N 7/173 | (2011.01) | |
| H04N 21/2743 | (2011.01) | |
| H04N 21/414 | (2011.01) | |
| H04N 21/422 | (2011.01) | |
| H04N 21/4223 | (2011.01) | |
| H04N 21/4786 | (2011.01) | |
| H04N 21/4788 | (2011.01) | |

(52) U.S. Cl.
CPC ......... *H04N 5/2252* (2013.01); *H04N 5/2253* (2013.01); *H04N 5/2257* (2013.01); *H04N 7/163* (2013.01); *H04N 7/17318* (2013.01); *H04N 21/2743* (2013.01); *H04N 21/41415* (2013.01); *H04N 21/4223* (2013.01); *H04N 21/42203* (2013.01); *H04N 21/4786* (2013.01); *H04N 21/4788* (2013.01)

(58) Field of Classification Search
CPC .. H04N 5/2257; H04N 7/163; H04N 7/17318; H04N 21/2743; H04N 21/41415; H04N 21/42203; H04N 21/4223; H04N 21/4786; H04N 21/4788; G06F 17/30; G06Q 10/10; G06Q 20/204; G11B 27/02; H04Q 5/221
USPC .............. 235/380, 382, 383, 454; 348/14.03, 348/14.01; 382/154, 118, 306; 386/241, 386/228; 455/411; 463/25, 16; 600/300; 705/14.16, 26.1, 37, 7.42, 53; 379/93.12; 701/1; 726/6, 5; 358/506; 365/232; 700/94; 704/201
See application file for complete search history.

(56) References Cited

U.S. PATENT DOCUMENTS

| | | | |
|---|---|---|---|
| 6,339,572 B1* | 1/2002 | Hamada | G11B 20/10 369/47.1 |
| 6,519,596 B1 | 2/2003 | Hoyt et al. | |
| 6,523,034 B1 | 2/2003 | Hoyt et al. | |
| 6,718,123 B1† | 4/2004 | Massarsky | |
| 7,038,588 B2 | 5/2006 | Boone et al. | |
| 7,252,265 B2 | 8/2007 | Perlo et al. | |
| 7,369,280 B2 | 5/2008 | Fredlund et al. | |
| 7,564,480 B2 | 7/2009 | Manico et al. | |
| 7,599,854 B1 | 10/2009 | Baum et al. | |
| 7,746,223 B2 | 6/2010 | Howarter et al. | |
| 7,779,058 B2 | 8/2010 | Shea | |
| 7,797,191 B2 | 9/2010 | Cotten et al. | |
| 7,797,204 B2 | 9/2010 | Balent | |
| 7,813,822 B1* | 10/2010 | Hoffberg | G06K 9/00369 381/73.1 |
| 7,860,606 B2 | 12/2010 | Rudy | |
| 7,961,212 B2 | 6/2011 | Woodworth et al. | |
| 7,962,948 B1 | 6/2011 | Girouard et al. | |
| 8,095,400 B2 | 1/2012 | Herde et al. | |
| 8,150,145 B2* | 4/2012 | Lemelin | G06Q 30/00 382/154 |
| 8,197,324 B2 | 6/2012 | Walker et al. | |
| 8,504,473 B2 | 8/2013 | Paintin et al. | |
| 8,619,115 B2 | 12/2013 | Stephens et al. | |
| 8,620,487 B2* | 12/2013 | Cochran | G07C 9/00087 340/5.2 |
| 8,725,804 B2 | 5/2014 | Gottfried | |
| 8,849,719 B2 | 9/2014 | Baker | |
| 9,789,977 B2* | 10/2017 | Yepez | B64F 1/366 |
| 2002/0039115 A1 | 4/2002 | Kawashima | |
| 2002/0047892 A1 | 4/2002 | Gonsalves | |
| 2002/0072974 A1* | 6/2002 | Pugliese, III | G06Q 30/02 705/14.16 |
| 2002/0083004 A1* | 6/2002 | Saneto | G06F 21/10 705/53 |
| 2002/0105665 A1 | 8/2002 | Wasilewski et al. | |
| 2002/0106620 A1 | 8/2002 | Barnum | |
| 2002/0112005 A1 | 8/2002 | Namias | |
| 2002/0125319 A1* | 9/2002 | Sasaki | G06K 19/06009 235/454 |
| 2002/0176610 A1* | 11/2002 | Okazaki | G06K 9/00221 382/118 |
| 2002/0199208 A1 | 12/2002 | Chang et al. | |
| 2003/0001846 A1† | 1/2003 | Davis | |
| 2003/0038835 A1 | 2/2003 | Defelice | |
| 2003/0047600 A1* | 3/2003 | Nakanishi | G06F 19/328 235/380 |
| 2003/0053719 A1* | 3/2003 | Katakura | G06Q 10/10 382/306 |
| 2003/0074373 A1* | 4/2003 | Kaburagi | G06F 16/58 |
| 2003/0078833 A1* | 4/2003 | Suzuki | G06Q 10/06398 705/7.42 |
| 2003/0132292 A1* | 7/2003 | Gomez | G06Q 20/00 235/383 |
| 2003/0160811 A1† | 8/2003 | Zigler | |
| 2003/0191816 A1 | 10/2003 | Landress et al. | |
| 2003/0195806 A1 | 10/2003 | Willman et al. | |
| 2004/0059953 A1* | 3/2004 | Purnell | G06F 21/34 726/6 |
| 2004/0120018 A1* | 6/2004 | Hu | H04N 1/00127 358/506 |
| 2004/0169722 A1* | 9/2004 | Pena | G07F 17/16 348/14.01 |
| 2004/0172451 A1 | 9/2004 | Biggs et al. | |
| 2004/0218047 A1† | 11/2004 | Goodman | |
| 2004/0261033 A1 | 12/2004 | Mabon | |
| 2005/0007965 A1 | 1/2005 | Hagen et al. | |
| 2005/0013594 A1 | 1/2005 | Eagan | |
| 2005/0015342 A1* | 1/2005 | Murata | G06Q 20/042 705/45 |
| 2005/0049931 A1 | 3/2005 | Wisnudel et al. | |
| 2005/0050571 A1 | 3/2005 | Wisnudel et al. | |
| 2005/0123268 A1* | 6/2005 | Kawaguchi | G11B 27/034 386/241 |
| 2005/0137942 A1 | 6/2005 | LaFleur | |
| 2006/0033809 A1 | 2/2006 | Farley | |
| 2006/0035625 A1* | 2/2006 | Shin | G06Q 20/346 455/411 |
| 2006/0062073 A1* | 3/2006 | Kitani | G06F 21/10 365/232 |
| 2006/0068897 A1* | 3/2006 | Sanford | G06Q 20/403 463/25 |
| 2006/0079325 A1 | 4/2006 | Trajkovic et al. | |
| 2006/0088284 A1 | 4/2006 | Shen et al. | |
| 2006/0116555 A1* | 6/2006 | Pavlidis | A61B 5/01 600/300 |
| 2006/0122896 A1* | 6/2006 | Parsley | G06Q 30/02 705/26.1 |
| 2006/0157555 A1* | 7/2006 | Dean | G06K 19/07 235/380 |
| 2006/0170670 A1 | 8/2006 | Burke | |
| 2006/0175396 A1 | 8/2006 | Call et al. | |
| 2007/0064855 A1 | 3/2007 | Ahuja | |
| 2007/0065143 A1 | 3/2007 | Didow et al. | |
| 2007/0071416 A1* | 3/2007 | Ikemizu | G11B 20/00086 386/259 |
| 2007/0174200 A1 | 7/2007 | Sung-Min et al. | |
| 2007/0205272 A1* | 9/2007 | Daddabbo | G06Q 20/18 235/382 |

(56) References Cited

U.S. PATENT DOCUMENTS

| | | | |
|---|---|---|---|
| 2008/0000966 A1* | 1/2008 | Keiser | G06Q 10/10 |
| | | | 235/382 |
| 2008/0005025 A1 | 1/2008 | Legere et al. | |
| 2008/0016165 A1 | 1/2008 | Lueth | |
| 2008/0103974 A1 | 5/2008 | Fridhendler et al. | |
| 2008/0168154 A1 | 7/2008 | Skyrm et al. | |
| 2008/0247543 A1 | 10/2008 | Mick et al. | |
| 2008/0250120 A1 | 10/2008 | Mick et al. | |
| 2008/0270163 A1 | 10/2008 | Green | |
| 2008/0292137 A1 | 11/2008 | Rhoads | |
| 2009/0013359 A1 | 1/2009 | Butler et al. | |
| 2009/0050693 A1* | 2/2009 | Clegg | B42D 15/022 |
| | | | 235/380 |
| 2009/0075692 A1 | 3/2009 | Park et al. | |
| 2009/0118849 A1 | 5/2009 | Dery et al. | |
| 2009/0157515 A1 | 6/2009 | Lafauci et al. | |
| 2010/0036670 A1 | 2/2010 | Hill et al. | |
| 2010/0174618 A1 | 7/2010 | Driessen | |
| 2010/0177157 A1* | 7/2010 | Stephens | G06Q 10/10 |
| | | | 348/14.03 |
| 2010/0283586 A1* | 11/2010 | Ikeda | H04N 1/00007 |
| | | | 340/10.42 |
| 2011/0076993 A1 | 3/2011 | Stephens | |
| 2011/0293278 A1 | 12/2011 | Mazed | |
| 2014/0071222 A1 | 3/2014 | Stephens et al. | |
| 2017/0155605 A1* | 6/2017 | Stephens | H04L 51/10 |

OTHER PUBLICATIONS

Patent Cooperation Treaty (PCT) International Search Report and Written Opinion for Application PCT/US 10/21165, dated Apr. 13, 2010, 7 pp., International Searching Authority, US.

Patent Cooperation Treaty (PCT) International Search Report and Written Opinion for Application PCT/US20 10/058302, dated Jan. 25, 2011, 10 pp., International Searching Authority, US.

* cited by examiner
† cited by third party

VIDEO COMMUNICATION SYSTEM AND METHOD FOR USING SAME

CROSS-REFERENCE TO RELATED APPLICATION

This application is a Continuation of U.S. application Ser. No. 14/084,258 entitled "Video Communication System and Method For Using Same," filed on Nov. 19, 2013, which is a Continuation of U.S. application Ser. No. 12/688,238 entitled "Video Communication System and Method For Using Same," filed on Jan. 15, 2010, now U.S. Pat. No. 8,619,115 issued on Dec. 31, 2013, which claims the benefit of U.S. Provisional Application 61/205,140 entitled "Video Communication System and Method For Using Same," filed Jan. 15, 2009, each of which is incorporated by reference in its entirety.

BACKGROUND

The present invention relates generally to a system and method for recording, transmitting, and accessing video communications.

Patrons at entertainment venues, sporting events, tourist attractions, and other leisure and business events often enjoy capturing visual memories of the event to share with friends and family. One way to share memories and messages from an event is by purchasing a post card, photograph or picture. Postcards, however, are limited to the pictures that are available for purchase and do not always convey the desired message. Furthermore, postcards are tedious because a user must prepare and mail them to each and every individual recipient.

In recent years, various electronic devices have been developed to improve the ways in which visual memories can be captured and shared. Devices such as digital cameras and video cameras allow users to capture and store high quality photos and video. However, these devices are often limited in their capacity to share and transfer the recorded pictures and video. Specifically, the picture and video files must be removed from the device and transferred to a computer or other medium before being shared with others. Additionally, the user is required to carry the digital camera or video camera with them at the given event.

More recently, other devices and technologies have been developed to improve the sharing of video files. Many cell phones, PDAs, and other electronic devices provide a convenient and direct way of communicating a photo or video message to an individual. For example, many cell phones are equipped with digital cameras for recording photos or videos. Additionally, many phones allow an electronic photo or video file to be sent to another cell phone via a text or an email or uploaded directly to the Internet. However, picture and sound quality on most mobile devices is limited due to the size of the electronic media files, and general cost constraints. Furthermore, sharing and accessibility of the video or photo is limited in many cases to other cell phones and mobile devices.

SUMMARY

A video communication system is provided. The video communication system includes a kiosk for recording video messages created by a user and a database for storing and providing access to the video messages. The kiosk includes a user interface for receiving user information such as name, address, email, and other identifying information. The kiosk further includes a message-recording device for recording a user video message. The video message and user information are uploaded to a database. The database associates the video message with the user information. The video message may be accessed via a website by inputting user information.

DESCRIPTION OF THE DRAWINGS

Objects and advantages together with the operation of the invention may be better understood by reference to the following detailed description taken in connection with the following illustrations, wherein.

DETAILED DESCRIPTION

The present invention relates to a system and method for recording, storing, and retrieving video communications.

Figure 1:
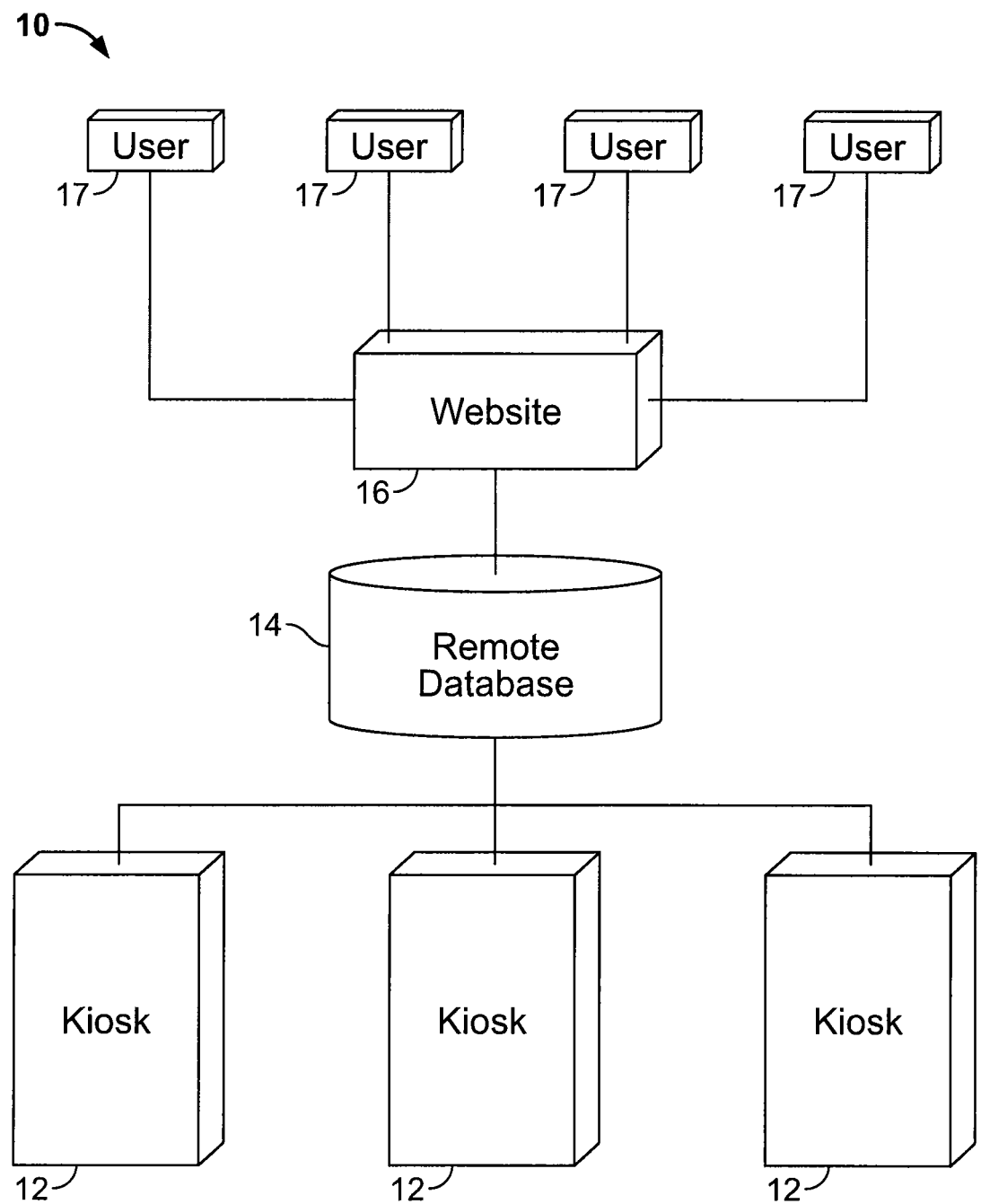
FIG. 1 illustrates a system diagram of a global video communication system.

With reference to FIG. 1, the video communication system 10 includes a plurality of kiosks 12 in communication with a database 14. As described below in further detail, each kiosk 12 is configured to receive and store video communications and corresponding message data. The kiosk 12 is further configured to communicate with the database 14. For example, the kiosk may upload video communications to the database 14 and receive instructions or messages from the database 14. It is understood that video communications may include audio files, video files, text files, other type of electronic media files, or any combination thereof. The database 14 may receive video communications and corresponding message data from the kiosk 12 and store the video communications based on the corresponding message data.

Message data may include information related to the user creating the video communication, the place where the video communication is created, the time when the video communication is created, or any other data that identifies the video communication or user creating the video. For example, information related to the user creating the video communication may include the user's name, a user-created username, the user's address, telephone number, email address, or other personal information. Likewise, information related to the place where the video communication was created may include the address or name of the venue where the video communication was created, the name of the event taking place at the venue when the video communication was created, or other similar identifying information.

The database 14 may allow stored video communications to be remotely accessed. For example, video communications stored on the database 14 may be accessible through a website 16. In an embodiment, a user 17 may retrieve a stored video communication from the database 14 by inputting a portion of the message data related to the desired video communication into the website 16. For example, the user may input message data such as a username or password associated with the video communication. The website 16 transmits the message data to the database 14. If the desired video communication and input message data match, the user may be allowed to access the video communication. The website 16 may permit the user to stream the video communication, download the video communication, or access the video communication by any other means known in the art.

The website 16 may be a social networking website. For example, the website 16 may allow users to create a user account based on user information. Users may create a user account while logged into the website or alternatively while using the kiosk 12 by inputting user information into the kiosk 12. In an embodiment, the kiosk 12 may automatically create a user account on the website 16 based on message data input by the user. Video communications created by a user at a kiosk 12 may be associated with the user's account on the website. Users on the website may connect with other users on the website to allow third party website users to access video communications.

The database 14 may send information related to the video communication and message data to a user. For example, the database 14 may send an email containing a weblink to the website 16 to the email address provided by a user. By activating the web link, a user may stream, download, or otherwise access the video communication. The database 14 may also send a text message or email web link to a cell phone, allowing the cell phone user to access the video communication. The database 14 may also send the user information related to the venue or event where the video communication was created. For example, the database may send mail or email advertisements to the user related to other events taking place at the venue where the video communication was created. Additionally, the database 14 may send advertisements to the user related to events at other venues, similar to the event where the video communication was created.

The video communication system 10 may allow persons other than the video communication creator to access the video communication via the website 16. For example, the video communication creator may input identifying information of other persons, such as email addresses, as part of the message data. Persons identified by the video communication creator will receive an email containing a web link to the website 16. By activating the web link, users 17 may access the website 16 where they may stream, download, or otherwise access the video communication. Additionally, the video communication creator may add persons to receive an email web link through the website 16. The website 16 and database 14 may limit access to the video communication based on a specified number of users 17, a predetermined length of time, or any other similar parameter.

The kiosk 12 and database 14 are configured to communicate via a remote network. For example, the kiosk 12 may communicate with the database 14 via the Internet, through a satellite connection, over a telephone line, via a cloud network, or by any other remote manner of communication known in the art. In an embodiment, the kiosk 12 includes a communication connection such as an Ethernet port, Wireless Large Area Network (WLAN) connection, WIFI or wireless connection, or other known wired or wireless communication means to communicate with the database 14.

Figure 2:
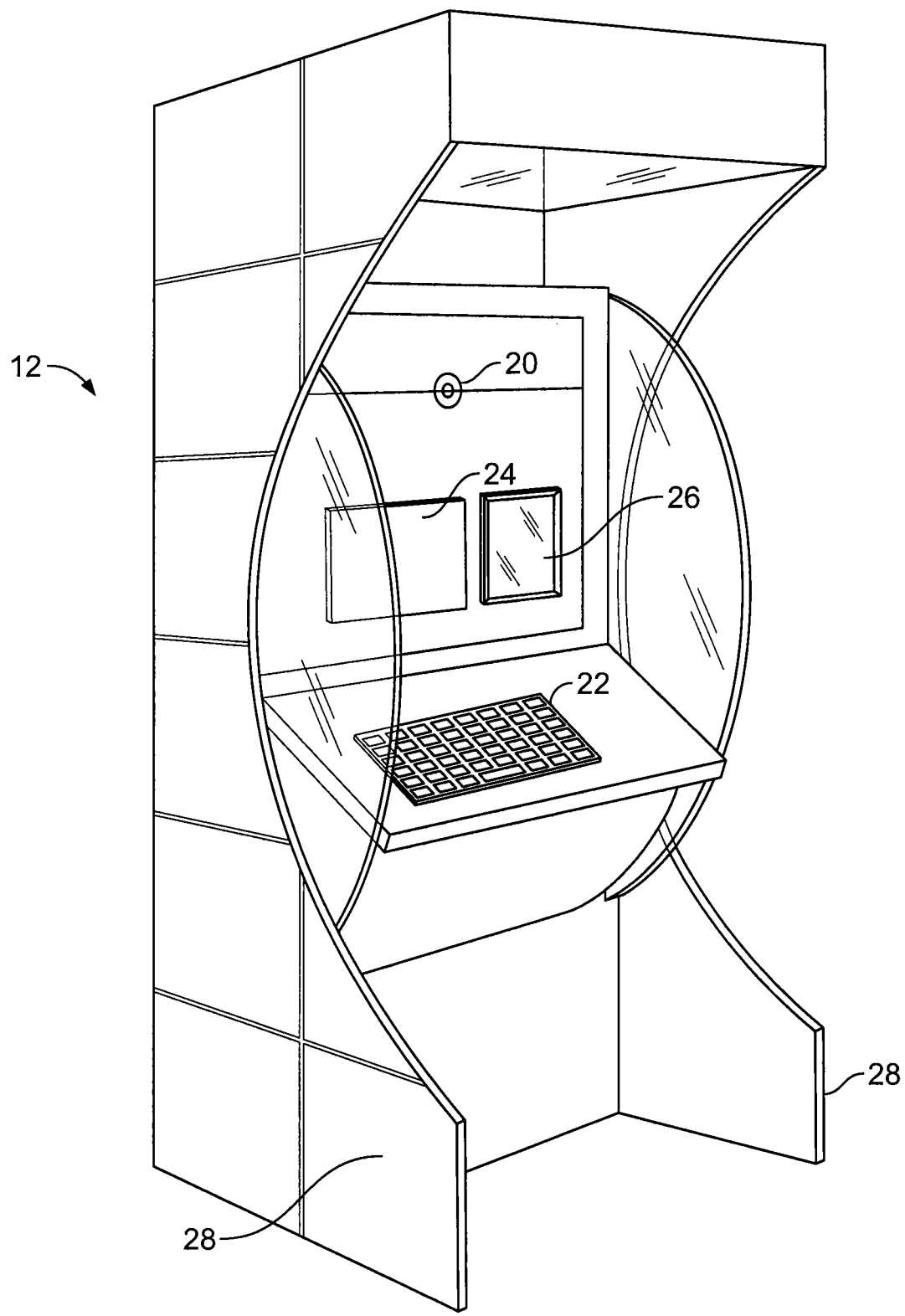
FIG. 2 illustrates a kiosk for recording a video communication.

FIG. 2 illustrates an embodiment of a kiosk 12. As shown, the kiosk 12 may be a free standing unit, housing various components for recording, storing and communicating a video communication. It will be appreciated, however, that a kiosk 12 may be any unit, freestanding or supported, that houses the components described herein. The kiosk 12 includes a message-recording device 20. The message-recording device 20 may include a visual recording component such as a camera, video camera, or web camera. In an embodiment, a camera is connected to an adjustable apparatus (not shown). The adjustable apparatus allows the user to change the height and angle of the camera in order to record at a desired position. The visual recording component may further be configured to record a portion of the venue where the kiosk 12 is located. For example, a kiosk 12 located at a baseball park may include a camera positioned to record a user such that the baseball field or other recognizable landmark is seen in the background. In one embodiment, the visual recording component may be positioned to record the user in front of a blank screen or green screen. The user may then select a background to be inserted into the video communication from a list of optional backgrounds.

The message-recording device 20 may further include a sound-recording component such as a microphone or other sound-receiving device. The sound-recording component may be integrated with or separate from the visual recording component. The message-recording device 20 may also include a keyboard 22, graphical user interface 31 such as a touch screen monitor, or other known components for receiving text from a user. The graphical user interface 31 may further be used as a second display to provide information to the user.

In an embodiment, the message-recording device 20 includes a digital video camera, a microphone, and a keyboard. The user may record a video communication of a specified length into the video camera. The user may further type a text or caption on the keyboard to be displayed on the video communication. The kiosk 12 may include a display 24 to allow the user to watch or review the video communication during or after it is recorded.

The kiosk 12 may include a memory component for storing video communications and message data. Message data input by the user may further be stored on the memory component and associated with the corresponding video communication created by the user. The kiosk 12 may periodically upload the video communications and message data from the memory component to the database 14 via the remote network connection. The kiosk 12 may be configured to upload the video communications and message data based on the number of video communications stored on the memory component, set time intervals, or any other parameter or set of parameters.

The kiosk 12 further includes an input device for inputting message data. The input device may include a keyboard 22, mouse, touch screen monitor, microphone, scanner, USB port, voice recognition, or any other means for inputting data. In one embodiment, the kiosk 12 may include a device for recognizing a user based on an identifier. For example, the kiosk 12 may include a card reader for recognizing and reading a user card. The user card may store user data, allowing a repeat user to input message data by inserting the user card into the card reader. Additionally, the kiosk 12 may recognize a user based on any unique identifier, including but not limited to a user's fingerprint, retinal scan, electronic device identification, or any other biometric parameter.

The kiosk may further include a display 24 or speaker for prompting the user to input data or communicating with the user in response to entered data. In an embodiment, the kiosk 12 includes a display 24, and a keyboard 22 or other input device, such as a touch screen. The display 24 may prompt the user to enter specific user information such as name, address, telephone number, email address, or other personal information. The user may enter the information using the keyboard 22 or other input device. The information may be stored on the memory component as message data, and associated with the corresponding video communication created by the user. When a user is not interacting with the kiosk 12, the monitor may display an advertisement loop or other Promotion material related to the venue or the features of the video communication system 10. Advertising and promotional material displayed by the kiosk 12 may be changed at the kiosk 12 or remotely changed by the database at any time.

The kiosk 12 includes a currency receiver 26. The currency receiver may include a bill acceptor, credit card reader, or any other manner for accepting payment known in the art. The kiosk 12 may also provide alternative payment means. For example, the kiosk 12 may allow a user to pay through PayPal, EBT, billing to a cellular phone, or other alternative forms of payment. The display 24 may prompt a user to enter payment.

Figure 3:
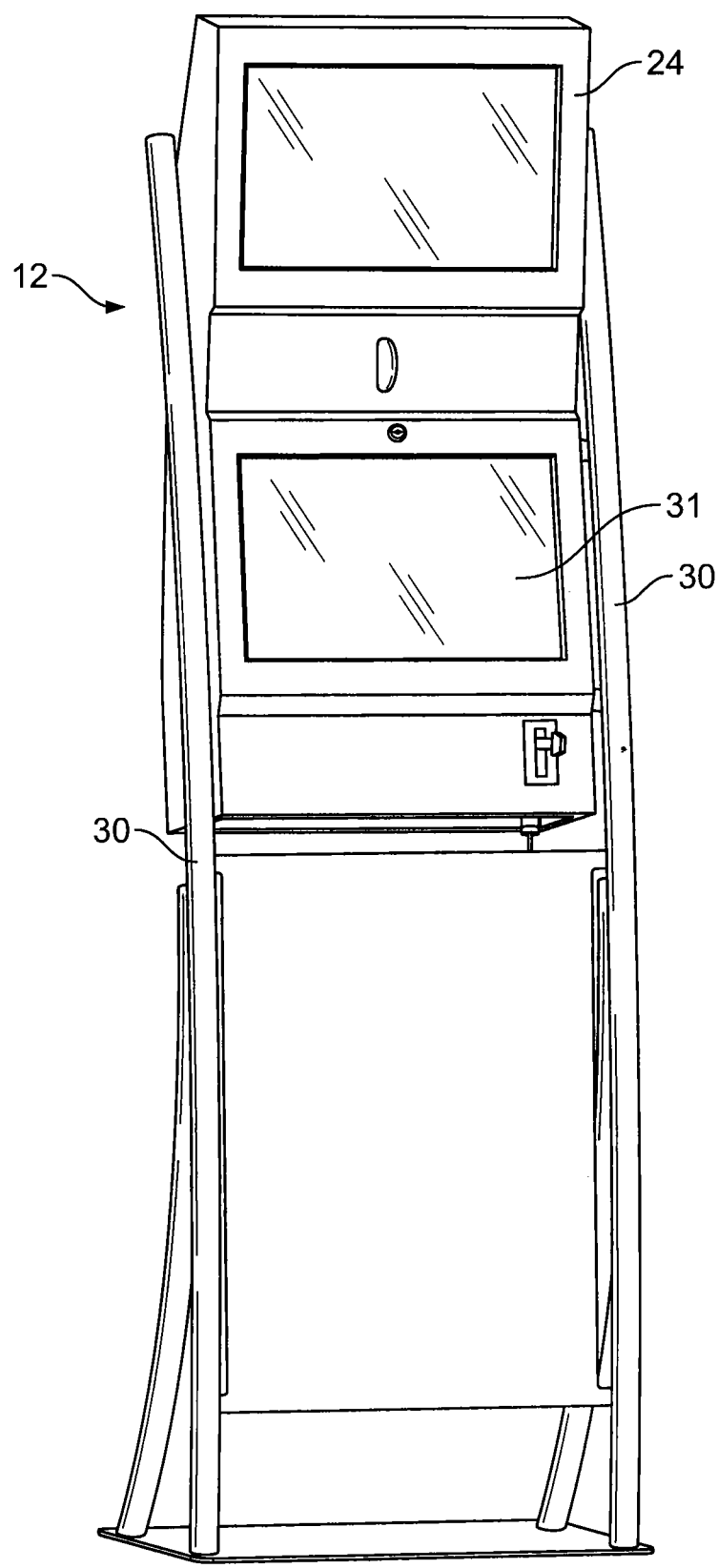
FIG. 3 illustrates an alternative embodiment of a kiosk for recording a video communication.

As illustrated in FIGS. 2 and 3, the kiosk 12 may be a stand-alone unit. With reference to FIG. 2, the components of the kiosk 12 may be contained within a body 28. Alternatively, as shown in FIG. 3, the components of the kiosk 12 may be connected to a leg assembly 30. It will be understood, however, that the kiosk 12 may be supported in any manner. For example, the kiosk 12 may be mounted or secured to a wall, post, or other stable portion of the venue. In addition, the kiosk 12 may be portable such as installed in a vehicle, or configured as a mobile unit.

Figure 4:
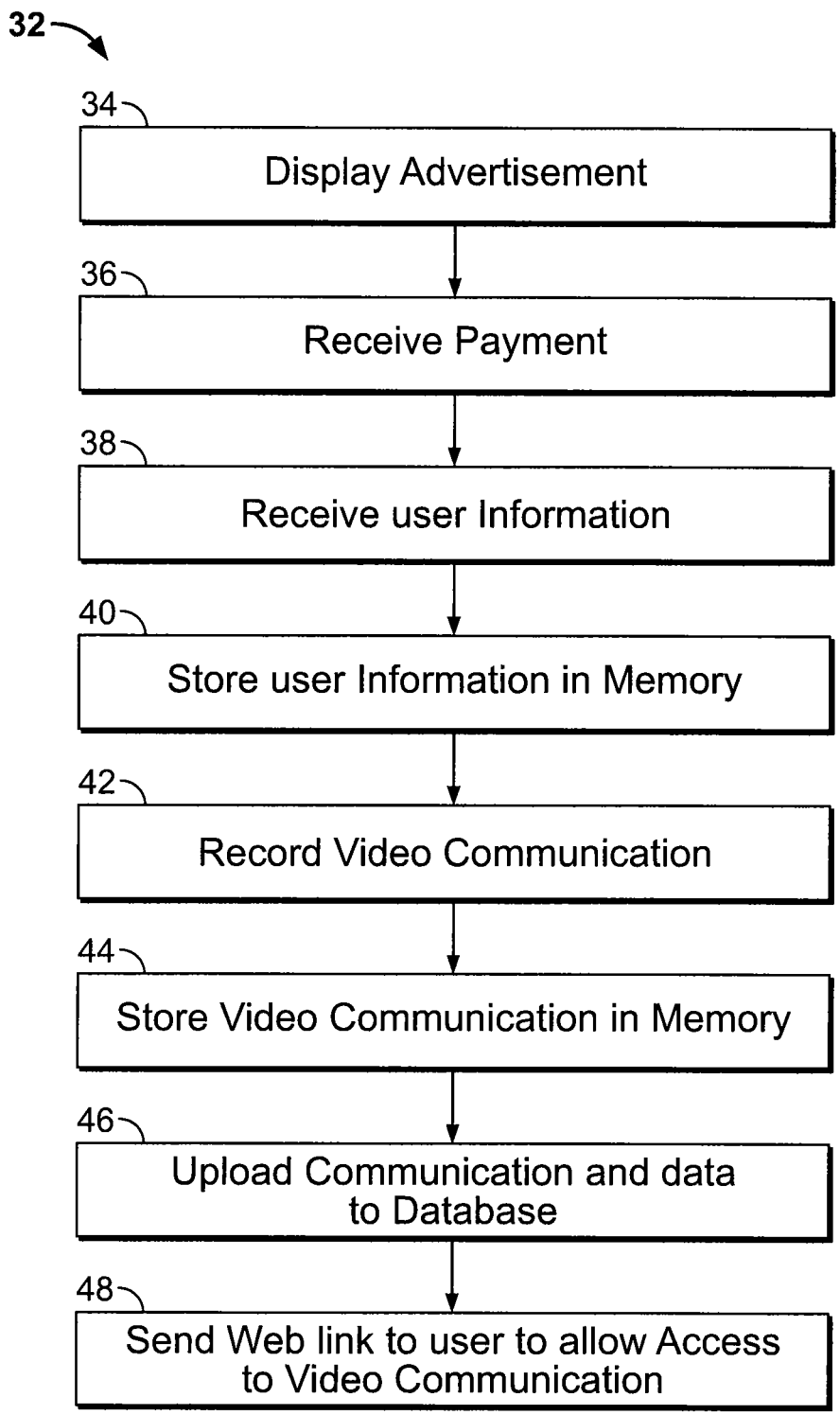
FIG. 4 illustrates a flow chart of a method for capturing, storing and retrieving a video communication.

With reference to FIG. 4, the kiosk 12 may display an advertisement or promotion 34 on the display 24 while there is no user is interacting with the kiosk 12. Once a user interacts with the kiosk 12, the video communication system 10 may prompt the user to enter a specified payment 36 before recording a video communication. The kiosk 12 may verify payment by verifying credit card information via the remote network or verifying that proper bills have been inserted into the currency receiver 26. In an embodiment, the kiosk 12 may allow a user to record a video communication without paying, allowing the user to record a video communication at no charge. The kiosk 12 may prompt the user to enter user information 38. As previously described, user information may include name, address, telephone number, email address, or other personal information. The user information may be stored on the memory component 40 and associated with the video communication to be created by the user. The user may then record a video communication 42 using the message-recording device 20. In an alternative embodiment, the user may record the video communication before entering user information. It will be appreciated, however, that the steps described herein may be completed in any order and are not limited to the order illustrated in FIG. 4.

The kiosk 12 may also be oriented to include two or more stations for the user to complete the tasks of payment, video recording and user information input (not shown). For example, the kiosk may include two stations that are opposite from each other. The first station includes the features that allow a user to make a payment and record a video. The second station includes the features that allow the user to input user information. Alternatively, the two stations can be configured in any manner to allow for payment, recording, and inputting user information. It is also contemplated that the kiosk can include three or more stations to complete payment, recording, and user input on separate stations. The multiple stations may be connected to a single database 14 or may be connected to multiple databases 14.

The kiosk 12 stores the video communication on the memory component 44, associated with the corresponding message data. The kiosk 12 uploads the video communications and message data 46 to the database 14, via the remote network. Video communications may be uploaded to the database 14 automatically upon completion of the video communication recording. Alternatively, the video communications may be uploaded to the database 14 at a predetermined time interval, or when a predetermined amount of memory space has been used. However, it is understood that video communications and message data may be uploaded to the database 14 based on any predetermined parameter or set of parameters. The database 14 sends a communication to the user 48 to allow the user to access the video communication. For example, the database 14 may send an email to the user containing a direct link to access the video communication. Additionally, the database may grant access to the video communications by sending a web link via email that allows the video communication to be streamed to a computer, viewed on a cell phone, downloaded, or otherwise accessed.

The invention has been described with reference to the embodiments. Obviously, modifications and alternations will occur to others upon a reading and understanding of this specification. The claims as follows are intended to include all modifications and alterations in so far as they come within the scope of the claim or an equivalent thereof.

What is claimed is:

1. A portable kiosk system comprising:
   an input device integrated within the portable kiosk operatively scanning an object to receive identification information associated with a user identity; and
   a message-recording device integrated within the portable kiosk and configured to capture media data comprising at least one of a video or a photograph;
   wherein the portable kiosk operatively:
      determines whether a user identity exists in a database based on the received identification information; and
      in response to determining that the user identity exists, associates the captured media data with the user identity.

2. The portable kiosk system of claim 1, wherein the portable kiosk operatively transmits the captured media data to a device connected to a communication network.

3. The portable kiosk system of claim 1, wherein the input device comprises a card reader.

4. The portable kiosk system of claim 3, wherein the card reader comprises a wireless card reader device.

5. The portable kiosk system of claim 1, wherein the input device comprises a scanner.

6. The portable kiosk system of claim 5, wherein the portable kiosk operatively identifies coded information based on information received from the scanner.

7. The portable kiosk system of claim 6, wherein the portable kiosk operatively identifies coded information in a bar code image.

8. The portable kiosk system of claim 5, wherein the scanner comprises a biometric scanner.

9. The portable kiosk system of claim 1, wherein the portable kiosk further comprises an adjustable apparatus coupled to the message recording device.

10. The portable kiosk system of claim 9, wherein the adjustable apparatus is positionable in more than one location to change a position of the message recording device.

11. A media message communication system comprising:
    a portable kiosk configured to communicate with a network, the portable kiosk comprising:
       a message-recording device configured to record a media message comprising at least one of a video or a photograph;

an input device operatively reading identification data related to the media message; and wherein the message-recording device and user interface are integrated within the portable kiosk.

12. The media message communication system of claim 11, wherein the input device comprises a wireless communication device.

13. The media message communication system of claim 12, wherein the wireless communication device comprises a near-field communication device.

14. The media message communication system of claim 11, wherein the wireless communication device operatively communicates with a user's mobile device.

15. The media message communication system of claim 11, wherein the portable kiosk transmits the media message to a user's mobile device.

16. A portable kiosk system comprising:
an input device integrated within the portable kiosk operatively scanning an object to receive identification information associated with a user identity; and
a message-recording device integrated within the portable kiosk and configured to capture media data comprising at least one of a video or a photograph;
wherein the portable kiosk automatically transmits the captured media data to a network device.

17. The portable kiosk system of claim 16, wherein the portable kiosk automatically transmits the captured media data to a social network associated based on the identification information.

18. The portable kiosk system of claim 17, wherein the portable kiosk automatically transmits the captured media data to another social network based on the identification information.

19. The portable kiosk system of claim 16, wherein the portable kiosk automatically transmits the captured media data to a social network profile of a user associated with the portable kiosk, wherein the user associated with the portable kiosk is a different entity from a user that captured the media data.

* * * * *